United States Patent
Wang et al.

(10) Patent No.: US 8,655,893 B2
(45) Date of Patent: Feb. 18, 2014

(54) ORGANIZING IMAGES CAPTURED BY MULTIPLE IMAGE CAPTURE DEVICES

(75) Inventors: Wiley H. Wang, San Mateo, CA (US); Eugene Chen, Belmont, CA (US); Preeti Nathan, San Carlos, CA (US); Trynne Anne Miller, San Francisco, CA (US)

(73) Assignee: Shutterfly, Inc., Redwood City, CA (US)

( * ) Notice: Subject to any disclaimer, the term of this patent is extended or adjusted under 35 U.S.C. 154(b) by 501 days.

(21) Appl. No.: 13/033,513

(22) Filed: Feb. 23, 2011

(65) Prior Publication Data
US 2012/0016892 A1    Jan. 19, 2012

Related U.S. Application Data

(60) Provisional application No. 61/364,889, filed on Jul. 16, 2010.

(51) Int. Cl.
*G06F 17/30* (2006.01)

(52) U.S. Cl.
USPC ........... 707/752; 707/758; 707/915; 348/159; 348/264

(58) Field of Classification Search
USPC .......... 707/752, 802, 736, 758, 915; 348/159, 348/264
See application file for complete search history.

(56) References Cited

U.S. PATENT DOCUMENTS

| | | |
|---|---|---|
| 3,982,744 A | 9/1976 | Kraynak |
| 4,918,490 A | 4/1990 | Stemmle |
| 4,975,010 A | 12/1990 | Karolyi |
| 5,247,320 A | 9/1993 | Kay |
| 5,287,199 A | 2/1994 | Zoccolillo |
| 5,457,904 A | 10/1995 | Colvin |
| 5,519,499 A | 5/1996 | Saito |
| 5,533,175 A | 7/1996 | Lung |
| 5,587,740 A | 12/1996 | Brennan |
| 5,615,015 A | 3/1997 | Krist |
| 5,740,270 A | 4/1998 | Rutenberg |
| 5,740,497 A | 4/1998 | Yamada |
| 5,867,282 A | 2/1999 | Fredlund |
| 5,903,728 A | 5/1999 | Semenzato |
| 5,907,410 A | 5/1999 | Ohtake |
| 5,907,640 A | 5/1999 | Delean |
| 5,918,213 A | 6/1999 | Bernard |
| 5,926,288 A | 7/1999 | Dellert |

(Continued)

FOREIGN PATENT DOCUMENTS

| | | |
|---|---|---|
| EP | 0 975 147 A2 | 10/1999 |
| WO | WO 01/82231 | 11/2001 |

*Primary Examiner* — Christyann Pulliam
*Assistant Examiner* — Rezwanul Mahmood
(74) *Attorney, Agent, or Firm* — Xin Wen

(57) ABSTRACT

A method for organizing images from multiple image capture devices includes allowing the determination of an offset between image capture times recorded in a first image capture device and image capture times recorded in a second image capture device, adjusting the image capture times recorded in the second image capture device by the offset to produce adjusted image capture times by a computer processor, and sequencing images taken by the first image capture device and the second image capture device in an chronological order. The sequencing is based on the image capture times for the images captured by the first image capture device and the adjusted image capture times for the images captured by the second image capture device.

18 Claims, 11 Drawing Sheets

(56) References Cited

U.S. PATENT DOCUMENTS

| | | | |
|---|---|---|---|
| 5,960,411 | A | 9/1999 | Hartman |
| 5,974,401 | A | 10/1999 | Enomoto |
| 5,982,994 | A | 11/1999 | Mori |
| 5,984,174 | A | 11/1999 | Kato |
| 6,005,482 | A | 12/1999 | Moran |
| 6,017,157 | A | 1/2000 | Garfinkle |
| 6,025,923 | A | 2/2000 | Kageyama |
| 6,038,033 | A | 3/2000 | Bender |
| 6,064,397 | A | 5/2000 | Herregods |
| 6,085,195 | A | 7/2000 | Hoyt |
| 6,091,506 | A | 7/2000 | Payne |
| 6,092,054 | A | 7/2000 | Tackbary |
| 6,097,389 | A | 8/2000 | Morris |
| 6,123,362 | A | 9/2000 | Squilla et al. |
| 6,133,985 | A | 10/2000 | Garfinkle |
| 6,154,295 | A | 11/2000 | Fredlund |
| 6,169,998 | B1 | 1/2001 | Iwasaki |
| 6,269,341 | B1 | 7/2001 | Redcay |
| 6,273,979 | B1 | 8/2001 | Lastoria |
| 6,288,719 | B1 | 9/2001 | Squilla |
| 6,321,231 | B1 | 11/2001 | Jebens et al. |
| 6,324,545 | B1 | 11/2001 | Morag |
| 6,327,050 | B1 | 12/2001 | Motamed |
| 6,332,146 | B1 | 12/2001 | Jebens et al. |
| 6,349,194 | B1 | 2/2002 | Nozaki |
| 6,353,445 | B1 | 3/2002 | Babula |
| 6,362,900 | B1 | 3/2002 | Squilla |
| 6,369,908 | B1 | 4/2002 | Frey |
| 6,374,260 | B1 | 4/2002 | Hoffert |
| 6,384,934 | B1 | 5/2002 | Kohtani |
| 6,388,732 | B1 | 5/2002 | William |
| 6,453,300 | B2 | 9/2002 | Simpson |
| 6,477,580 | B1 | 11/2002 | Bowman-Amuah |
| 6,554,504 | B2 | 4/2003 | Cook |
| 6,570,640 | B1 | 5/2003 | Garfinkle et al. |
| 6,583,852 | B2 | 6/2003 | Baum |
| 6,667,814 | B1 | 12/2003 | Tillotson |
| 6,727,909 | B1 | 4/2004 | Matsumura |
| 6,738,494 | B1 | 5/2004 | Savakis |
| 6,955,003 | B1 | 10/2005 | Lew |
| 7,197,513 | B2 | 3/2007 | Tessman |
| 7,222,147 | B1 | 5/2007 | Black |
| 2001/0005834 | A1 | 6/2001 | Simpson |
| 2001/0010772 | A1 | 8/2001 | Nakajima |
| 2002/0001102 | A1 | 1/2002 | Williams |
| 2002/0138363 | A1 | 9/2002 | Karas |
| 2002/0154147 | A1 | 10/2002 | Battles |
| 2003/0026457 | A1* | 2/2003 | Nahum ............... 382/106 |
| 2003/0214660 | A1 | 11/2003 | Plass |
| 2004/0023135 | A1 | 2/2004 | Rochford |
| 2004/0032599 | A1 | 2/2004 | Atkins |
| 2004/0133924 | A1 | 7/2004 | Wilkins |
| 2005/0110880 | A1* | 5/2005 | Parulski et al. ........ 348/231.5 |
| 2006/0008175 | A1 | 1/2006 | Tanaka |
| 2006/0064639 | A1 | 3/2006 | Reid |
| 2006/0125920 | A1* | 6/2006 | Criminisi et al. ........ 348/159 |
| 2008/0218613 | A1* | 9/2008 | Janson et al. ........... 348/262 |
| 2009/0044131 | A1* | 2/2009 | Pylappan et al. ........ 715/752 |
| 2010/0149372 | A1* | 6/2010 | Silverstein ............ 348/223.1 |
| 2010/0213251 | A1* | 8/2010 | Hvidtfeldt ............. 235/375 |
| 2011/0055284 | A1* | 3/2011 | Wallace et al. ......... 707/802 |
| 2011/0055765 | A1* | 3/2011 | Neubrand et al. ....... 715/838 |
| 2011/0235858 | A1* | 9/2011 | Hanson et al. .......... 382/103 |

* cited by examiner

ORGANIZING IMAGES CAPTURED BY MULTIPLE IMAGE CAPTURE DEVICES

The present patent application claims priority to commonly assigned U.S. provisional patent application No. 61/364,889, entitled "Organizing images captured by multiple digital cameras" filed Jul. 16, 2010 by the same inventors, the content of which is incorporated herein by reference.

BACKGROUND OF THE INVENTION

In recent years, photography has been transformed from chemical based technologies to digital imaging technologies. A phenomenon associated with digital photography is the large number of images that an average user can generate and have to organize in a short period of time. A typical vacation trip can easily produce hundreds to thousands of digital images. Digital images can be captured by different types of imaging devices. A typical household may own a number of image capture devices such as single-lens reflex (SLR) and point-and-shoot digital cameras manufactured by Canon, Nikon, Kodak, HP, etc., camera phones made by Nokia, Apple Computer, Samsung, HTC, Motorola, etc., and video cameras that can take still images.

The captured images can be stored on local computer devices or remote servers, and can be viewed locally or online. Digital images can also be used to create personalized image products such as photo books, photo calendars, photo cards, photo stationeries, photo prints, photo mugs, photo T-shirts, and so on. Some image products (e.g. photo books, calendars, and collages) can incorporate tens to hundreds of images obtained by different image capture devices. Some image usages involve digital images taken by different users. For example, an image share site may publish a large number of images captured with different devices by different users that are associated with each other in an extended family, as classmates, members of a club or a sport team, etc.

A challenge associated with organizing digital images is that the digital images from different imaging devices often do not carry consistent information. The file names from different cameras are different. Some image capture devices include EXIF (Exchangeable image file format) header files; but some don't. Additionally, the information stored in the EXIF header files may not be correct. For example, many users do not set the clocks in their digital cameras. The clock times of many cameras are still based on the default start times (12:00:00 2006/1/1, 12:00:00 2008/1/1/) originally set in the factories.

There is therefore a need to effectively organize a large number of images to allow users to conveniently create image products and share images.

SUMMARY OF THE INVENTION

In one aspect, the present application relates to a computer system that includes one or more computer processors that can enable the determination of an offset between image capture times recorded in a first image capture device and image capture times recorded in a second image capture device, to adjust the image capture times recorded in the second image capture device by the offset to produce adjusted image capture times, and to sequence images taken by the first image capture device and the second image capture device in an chronological order, wherein the sequencing is based on the image capture times for the images captured by the first image capture device and the adjusted image capture times for the images captured by the second image capture device.

In another aspect, the present application relates to a method for organizing images from multiple image capture devices. The method includes allowing the determination of an offset between image capture times recorded in a first image capture device and image capture times recorded in a second image capture device; adjusting the image capture times recorded in the second image capture device by the offset to produce adjusted image capture times by a computer processor; and sequencing images taken by the first image capture device and the second image capture device in an chronological order, wherein the sequencing is based on the image capture times for the images captured by the first image capture device and the adjusted image capture times for the images captured by the second image capture device.

Implementations of the system may include one or more of the following. The method can further include sequencing images captured by the first image capture device based on the image capture times recorded by the first image capture device; and sequencing images captured by the second image capture device based on the image capture times recorded by the second image capture device. The step of allowing the determination of an offset can include sampling image counts of images captured by the first image capture device at a first time interval to create a first image count distribution (ICD); sampling image counts of images captured by the second image capture device at the first time interval to create a second ICD; computing a first correlation function between the first ICD and the second ICD by a computer; and using the correlation function to determine a first value for the offset between image capture times in the first image capture device and the second image capture device. The first value for the offset can be determined by the maximum value in correlation function. The first time interval can be in a range from about 2 min to about 45 min. The step of allowing the determination of an offset further can include sampling image counts of images captured by the first image capture device at a second time interval to create a third image count distribution (ICD); sampling image counts of images captured by the second image capture device at the first time interval to create a fourth ICD; computing a second correlation function between the third ICD and the fourth ICD; using the correlation function to determine a second value for the offset between image capture times in the first and the second image capture devices; and selecting one of the first value and the second value, wherein the image capture times recorded in the second image capture device are adjusted by the selected one of the first value and the second value. The step of allowing the determination of an offset further comprises: allowing a user to select, using a computer device, a first image captured by the first image capture device and a second image captured by the second image capture device and to identify the first image and the second image to be taken at about the same time; and computing the offset based on image capture times of the first image and the second image. The offset is related to the difference between the clock times in the first image capture device and the second image capture device. The method can further include allowing the images taken by the first image capture device and the second image capture device in the chronological order to be displayed on a computer device. The computer device can be connected to the computer processor via a computer network. The computer processor can reside in the computer device. The first image capture device and the second image capture device can include at least one of a digital camera, a camera phone, a video camera, a laptop computer, or a tablet computer. The method can further include allowing images from the first image capture device and the second image capture device to be incorporated, in the chronological order, into the design of an image product. The method can further include allowing images from the first image capture device and the second image capture device to be published in the chronological order on a web media. The web media can include a blog page.

Embodiments may include one or more of the following advantages. The disclosed methods and systems can significantly save users' times spent on organizing a large number of digital images captured by different image capture devices. The disclosed methods and systems can intelligently compensate for discrepancies in clock times between different image capture devices, and automatically sequence images from different image capture devices in a correct chronological order. The disclosed methods and systems can make it easier for users to use images to tell a story about their memories. The disclosed methods and systems also make it easier for users to create image products such as photo books and create photo blog pages using images captured by different image capture devices.

Although the invention has been particularly shown and described with reference to multiple embodiments, it will be understood by persons skilled in the relevant art that various changes in form and details can be made therein without departing from the spirit and scope of the invention.

DETAILED DESCRIPTION OF THE INVENTION

Figure 1:
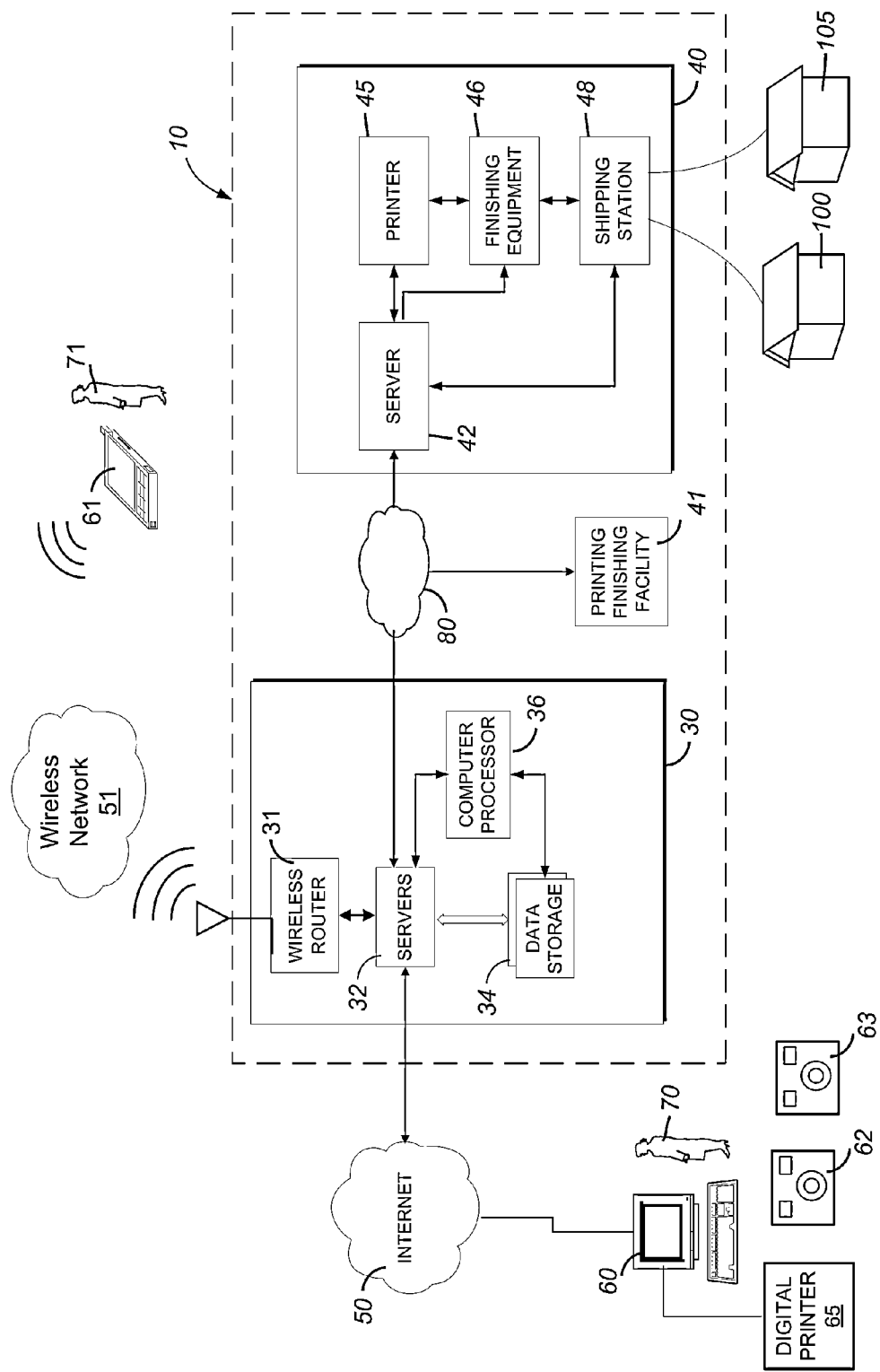
FIG. 1 is a block diagram for an imaging service system for producing personalized image products.

Referring to FIG. 1, an imaging service system 10 can enable users 70, 71 to organize and share images via a wired network or a wireless network 51. Optionally, the imaging service system 10 can also fulfill image products for the users 70, 71. The imaging service system 10 includes a data center 30, one or more product fulfillment centers 40 and 41, and a computer network 80 that facilitates the communications between the data center 30 and the product fulfillment centers 40 and 41.

The data center 30 can include a server 32 for communicating and receiving input from the users 70, 71, a data storage device 34 for storing user data, image and design data, and a computer processor 36 for rendering images, organizing images, and processing orders. The user data can include account information, discount information, and order information associated with the user. A website can be powered by the servers 32 and can be accessed by the user 70 using a computer device 60 via the Internet 50, or by the user 71 using a wireless device 61 via the wireless network 51.

The imaging service system 10 can provide products that require user participation in designs and personalization. Examples of these products include the personalized image products provided by Shutterfly, Inc. In the present disclosure, the term "personalized" refers to the information that is specific to the recipient, the user, the gift product, and the occasion, which can include personalized content, personalized text messages, personalized images, and personalized designs that can be incorporated in the image products. The content of personalization can be provided by a user or selected by the user from a library of content provided by the service provider. The term "personalized information" can also be referred to as "individualized information" or "customized information".

Personalized image products can include users' photos, personalized text, personalized designs, and content licensed from a third party. Examples of personalized image products may include photo books, personalized greeting cards, photo stationery, photo or image prints, photo posters, photo banners, photo playing cards, photo T-shirts, photo coffee mugs, photo pads, photo key-chains, photo collectors, photo coasters, or other types of photo gift or novelty item. Photo book generally refers to a bound multi-page product that includes at least one image on a book page. Photo books can include photo albums, scrapbooks, bound photo calendars, or photo snap books, etc.

The user 70 or her family may own multiple cameras 62, 63. The user 70 transfers images from cameras 62, 63 to the computer device 60. The user 70 can edit, organize images from the cameras 62, 63 on the computer device 60. The computer device 60 can be in many different forms: a personal computer, a laptop, or tablet computer (e.g. IPad), a mobile phone etc. The camera 62 can include a camera that is integrated or connected with in the computer device 60. For example, laptop computers or computer monitors can include built-in camera for picture taking. The user 70 can also print pictures using a printer 65 and make image products based on the images from the cameras 62, 63. The cameras 62, 63 can include a digital camera, a camera phone, a video camera capable of taking still images, a laptop computer, or a tablet computer.

The images from the cameras 62, 63 can also be uploaded to the server 32 to allow the user 70 to organize and render images at the website, share the images with others, and design or order image product using the images from the cameras 62, 63. The wireless device 61 can include a mobile phone, a tablet computer, or a laptop computer, etc. The wireless device 61 can include a built-in camera (e.g. in the case of a camera phone). The images taken by the user 71 using the wireless device 61 can also be uploaded to the data center 30. If users 70, 71 are members of a family or associated in a group (e.g. a soccer team), the images from the cameras 62, 63 and the mobile device 61 can be grouped together to be incorporated into an image product such as a photo book, or used in a blog page for an event such as a soccer game.

Figure 2:
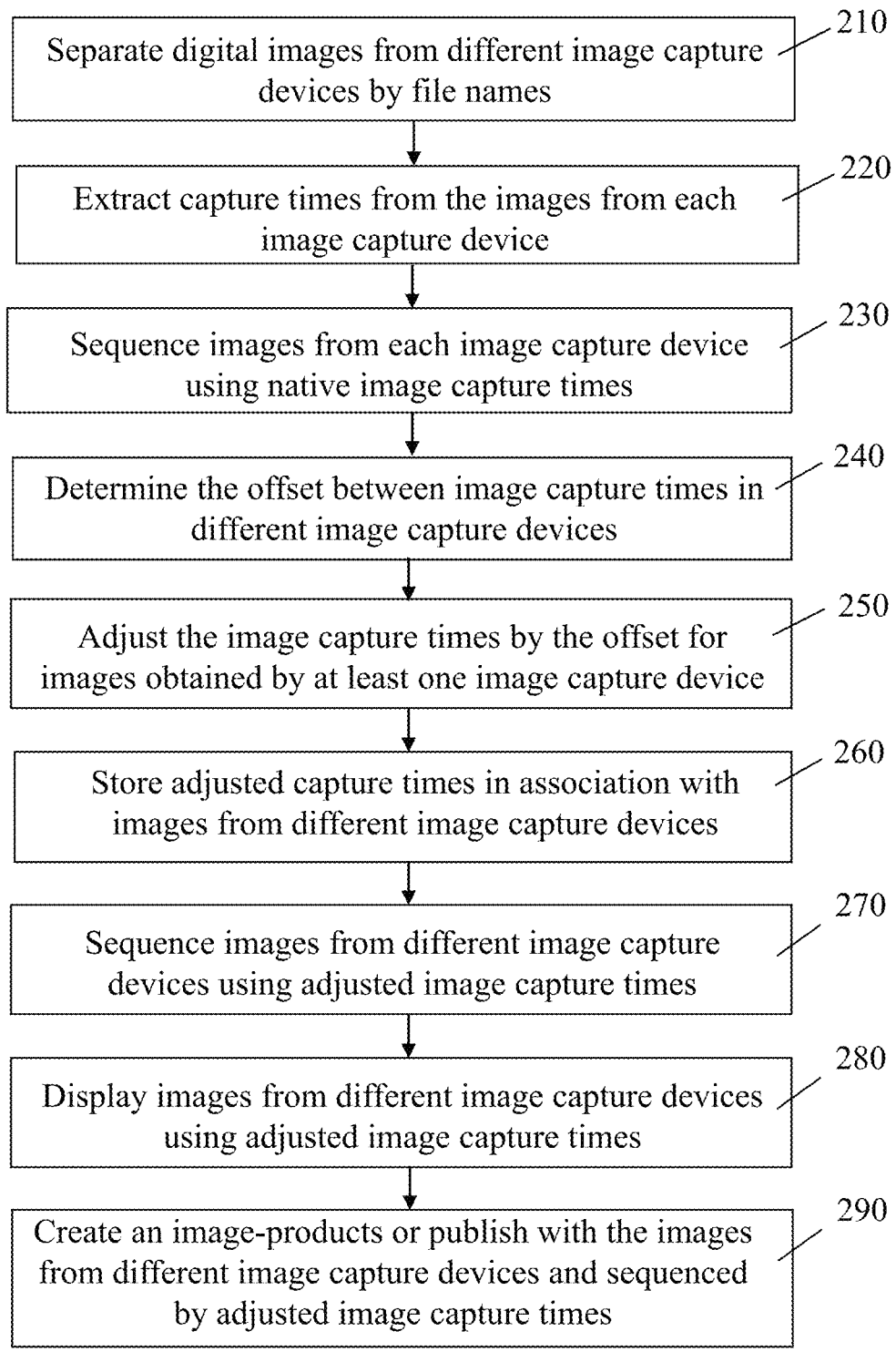
FIG. 2 is a flowchart for intelligently organizing images from different image capture devices.
Figure 3:
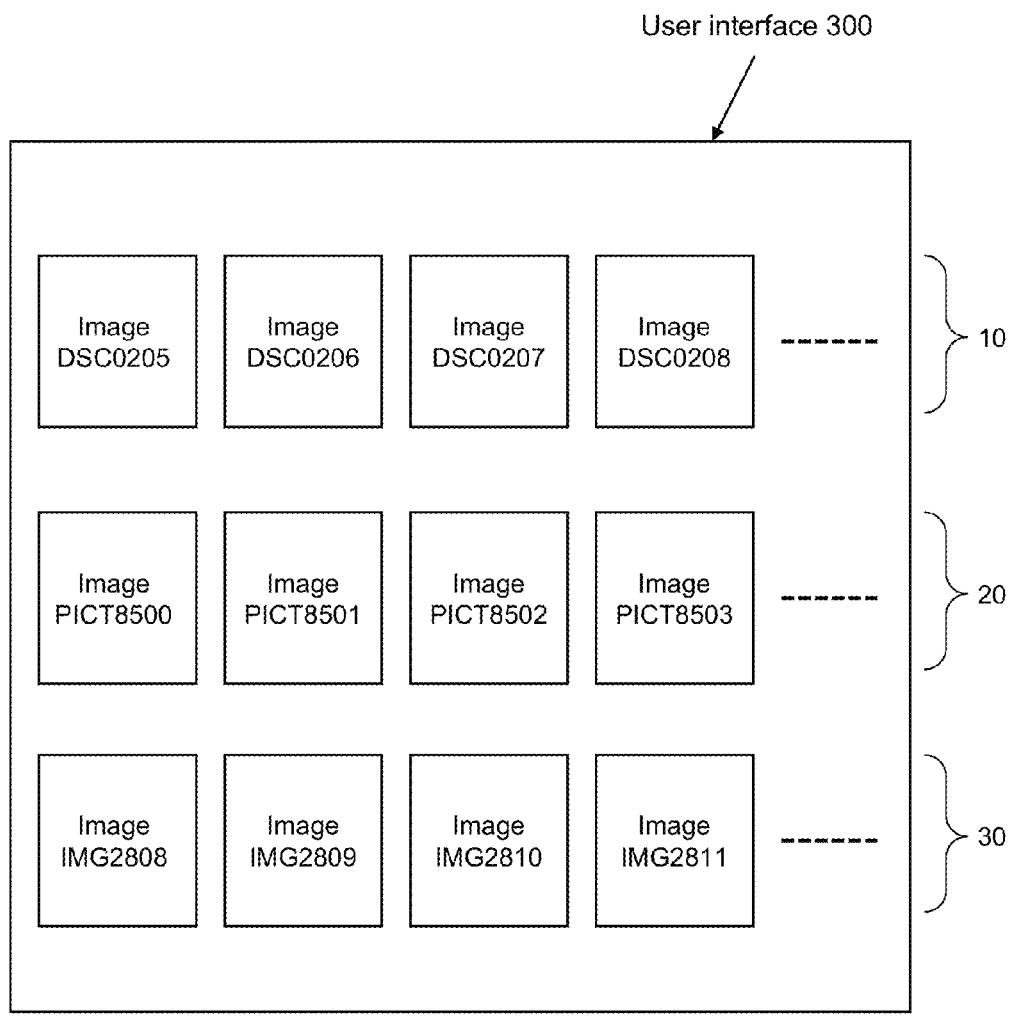
FIG. 3 illustrates a user interface comprising images obtained by different image capture devices.

In accordance with the present invention, the images from different image capture devices can be intelligently organized on a standalone computer device such as the computer device 60 and the wireless device 61, or, over the computer network, by a remote computer system such as the data center 30 and the computer processor 36. Referring to FIGS. 2 and 3, the digital images from different image capture devices are first separated by file names and/or their respective manufacturers and models (step 210, FIG. 2). Digital images from different image capture devices (such as cameras 62, 63, video cameras, or a mobile phone) usually have different file names such as DSC0205-DSC0208, PICT8500-PICT8503, IMG2808-2811 . . . etc., as shown in a user interface 300. The numbers after the alphabet characters indicate the sequence in which the images are captured by the specific image capture device. For example, the images from three cameras are separated into different groups 10, 20, and 30.

The user interface 300 can be provided by a software application installed on the computer device 60 (or the mobile device 61), which facilitates image viewing, organization, editing, rendering, and/or image product design using images on the same computer device (or mobile device). The user interface 300 can also be implemented as a web browser or a client application, which serves as a communication interface with a remote server such as server 32 via a computer network such as the Internet 50 or the wireless network 51.

The capture times of the images are then extracted from the images from each image capture device (step 220, FIG. 2). The image capture times are often stored in the EXIF files associated with the images. The images from each image capture device are then sequenced using the native image capture times originally stored by the image capture devices (step 230, FIG. 2). Although the clock of an image capture device may not reflect the real time and date, the native capture times of the image capture device can provide correct relative chronological order (but may not reflect the correct absolute times) for images captured by that image capture device. For example, the images DSC0205-DSC0208 in the group 10 are chronologically sequenced according to their respective natively recorded capture times. Similarly, the images in the group 20 and the group 30 are respectively sequenced using the image capture times of their respective image capture devices.

However, because the clocks of different image capture devices are often not correctly set, the images in the different groups 10, 20, 30 cannot be sequenced using a common capture time. For images taken at the same time, the image capture times recorded by different image capture devices often differ by an offset because some or all of the image capture devices do not have the correct dates and times.

Figure 4:
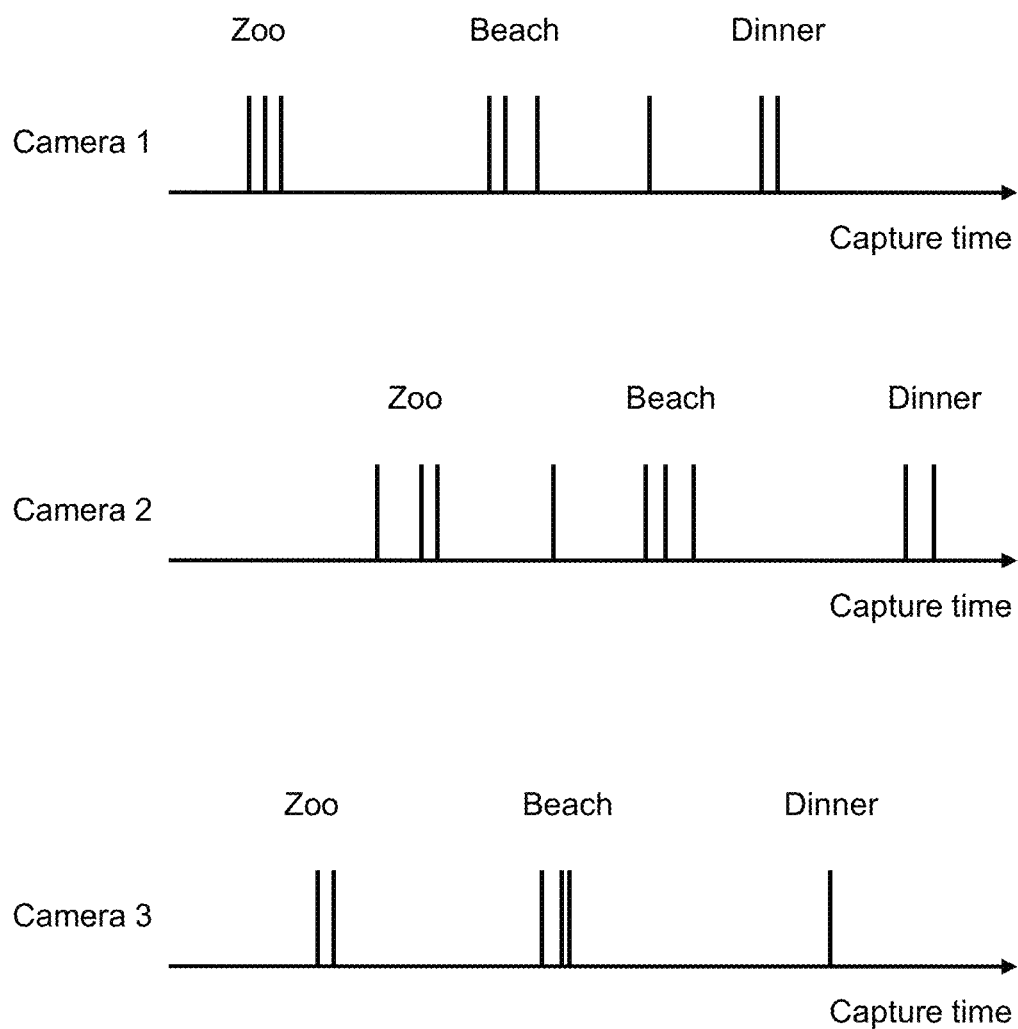
FIG. 4 illustrates image counts along the capture time respectively recorded by different image capture devices.

The offsets on image capture times between different image capture devices can be determined manually or automatically (step 240, FIG. 2). FIG. 4 illustrates image capture times of images captured by different cameras. Image captures by camera 1, camera 2, and camera 3 are plotted against their respective native capture times. Images captured by the three cameras are clustered around events such as "zoo", "beach", and "dinner", which however are recorded with different the image capture times on different cameras.

Figure 5:
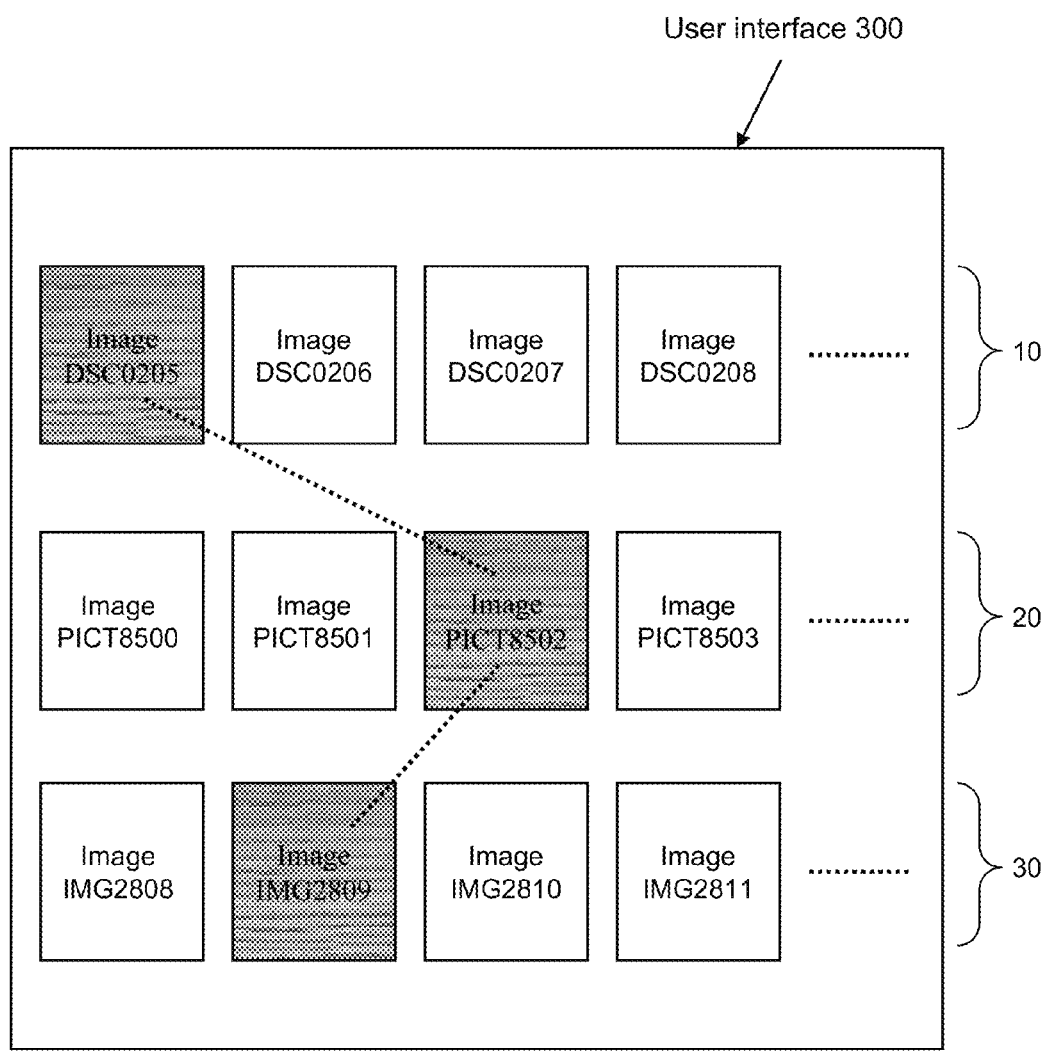
FIG. 5 illustrates user enabled correlation between images obtained by different image capture devices at the user interface shown in FIG. 3.

In some embodiments, the offset time can be manually determined with the assistance of a user. As shown in FIG. 5, the user can use the image content as clues to select images in different groups 10, 20, 30 that were captured at approximately the same times. For example, if images DSC0205, PICT8502, IMG2809 include the same scene (e.g. kids building sand castle on a beach), the user can remember or infer that these images from different cameras are taken at about the same time. The user can click and highlight one image (e.g. DSC0205, PICT8502, IMG2809) in each group 10, 20, 30 to identify these images as being taken at about the same time.

Figure 6:
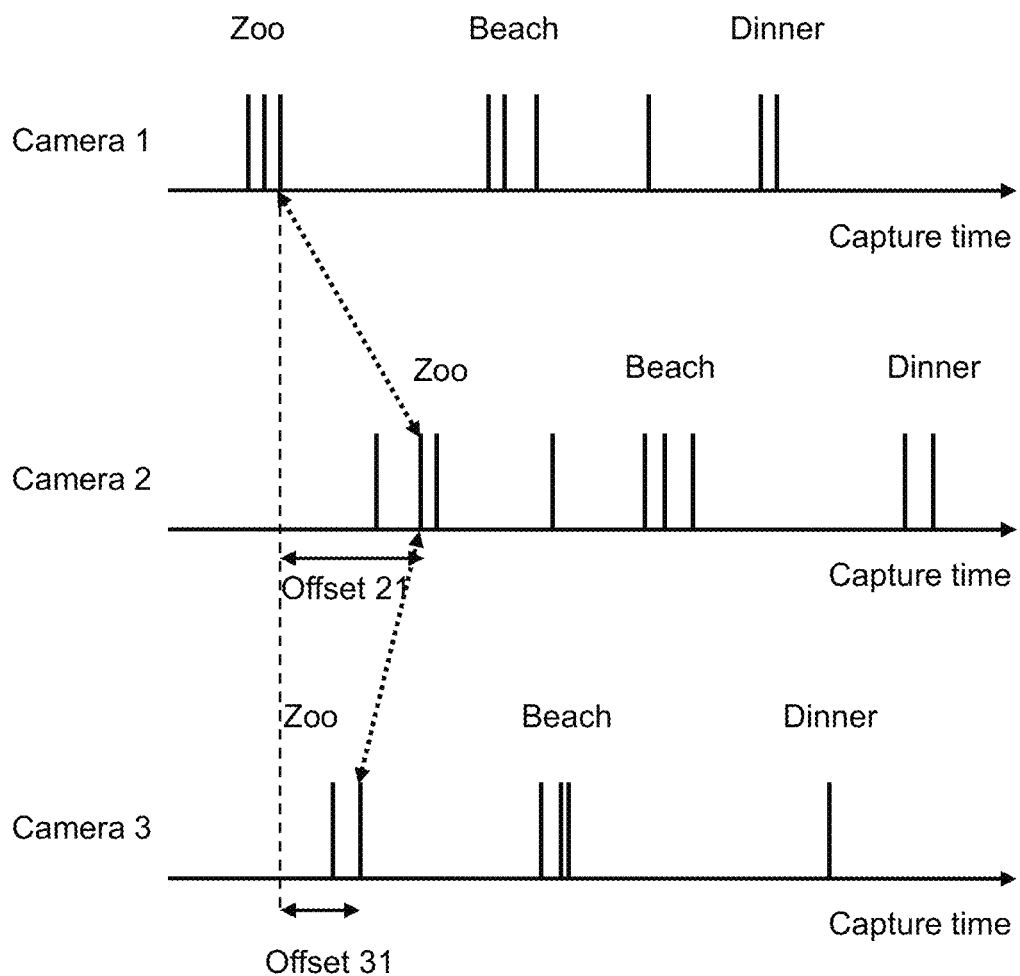
FIG. 6 illustrates the correlation and offsets between the capture times natively recorded by different image capture devices.

Referring to FIG. 6, the correlations between images DSC0205, PICT8502, IMG2809 are illustrated by the double-headed arrows connecting the images from different cameras. The offset between cameras 1 and camera 2 is indicated by offset 21. The offset 21 is related to the differences between the clock times of camera 1 and camera 2. The offset between cameras 1 and camera 3 is indicated by offset 31. Once the images taken by different cameras at about the same time are correlated by the user, the computer device 60 or the computer processor 36 (FIG. 1) can calculate offset 21 (step 240, FIG. 2) by subtracting the capture time of the image PICT8502 by the image capture time of the image DSC0205. Similarly, the computer device 60 or the computer processor 36 (FIG. 1) can calculate offset 31 (step 240, FIG. 2) by subtracting the capture time of the image IMG2809 by the image capture time of the image DSC0205.

Figure 7:
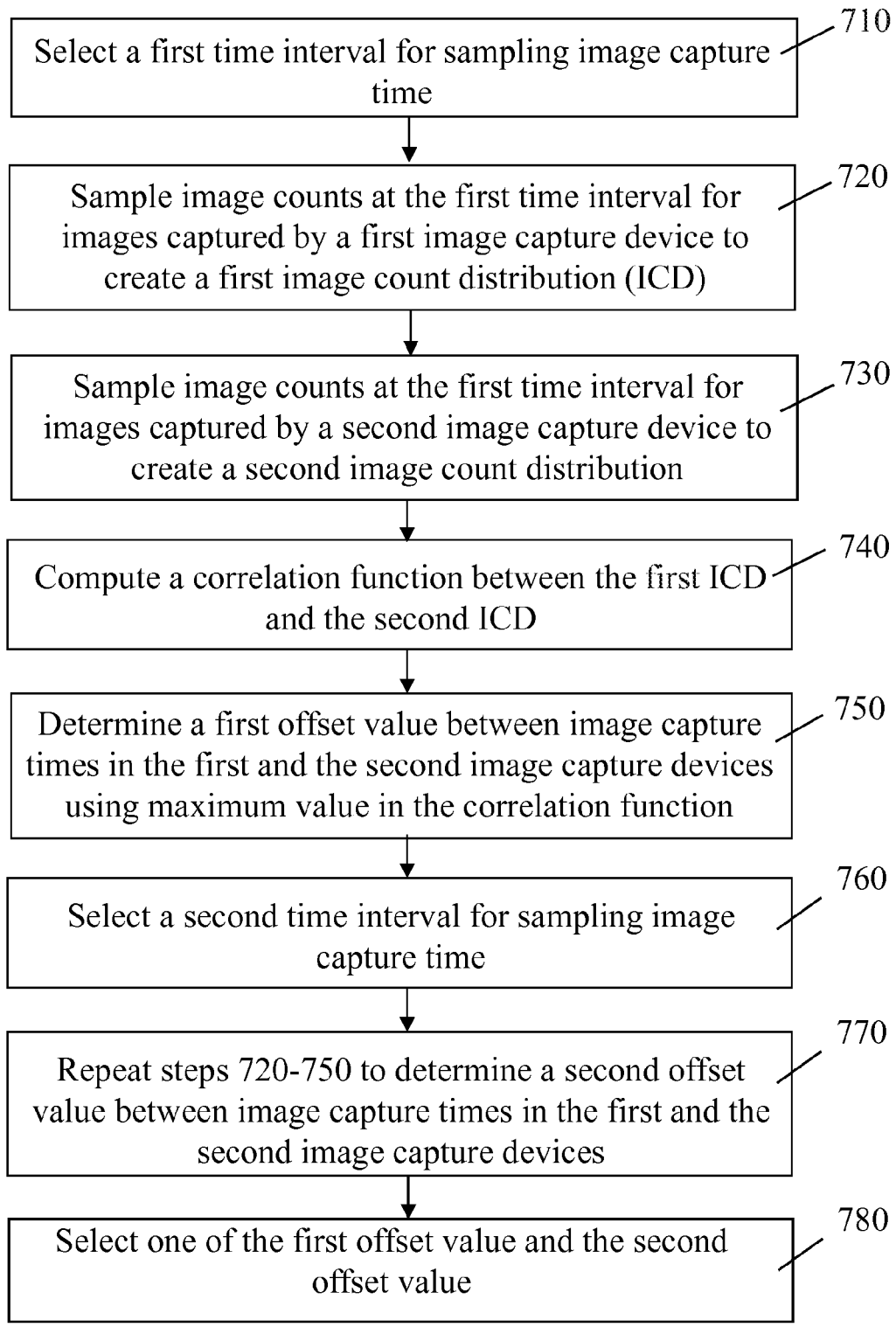
FIG. 7 shows steps for automatically determining offset between image capture times in two image capture devices.
Figure 8:
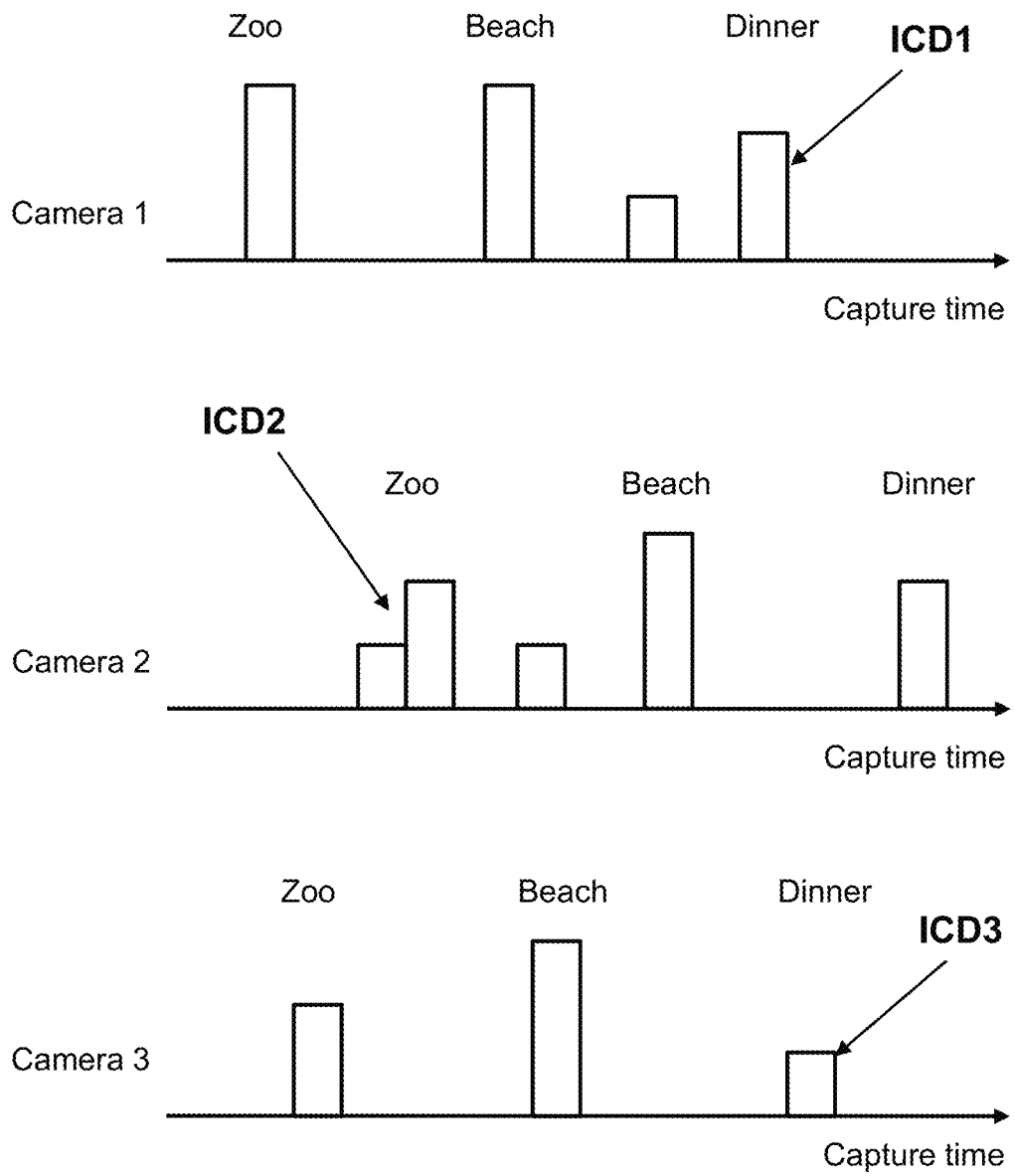
FIG. 8 illustrates image counts sampled at predetermined time intervals along the image capture time for each of the image capture devices.

In some embodiments, referring to FIG. 7, the offsets between image capture times of different cameras can be automatically determined by a computer processor in the computer device 60 or the mobile device 61, or the computer processor 36. A time interval e.g. 5 min or 10 min is selected (step 710). For each camera, the image counts can be sampled at a along its natively recorded image capture time, in other words, all images captured in each time interval is summed up and recorded as the image count for that time interval (steps 720, 730). The resulting image counts distributions (ICDs) for images from different camera 1 (ICD1), camera 2 (ICD2), and camera 3 (ICD3) are shown in FIG. 8. The images taken by the three cameras at the same event ICDs also differ by offsets similar to the raw image counts as shown in FIGS. 4 and 6.

Figure 9:
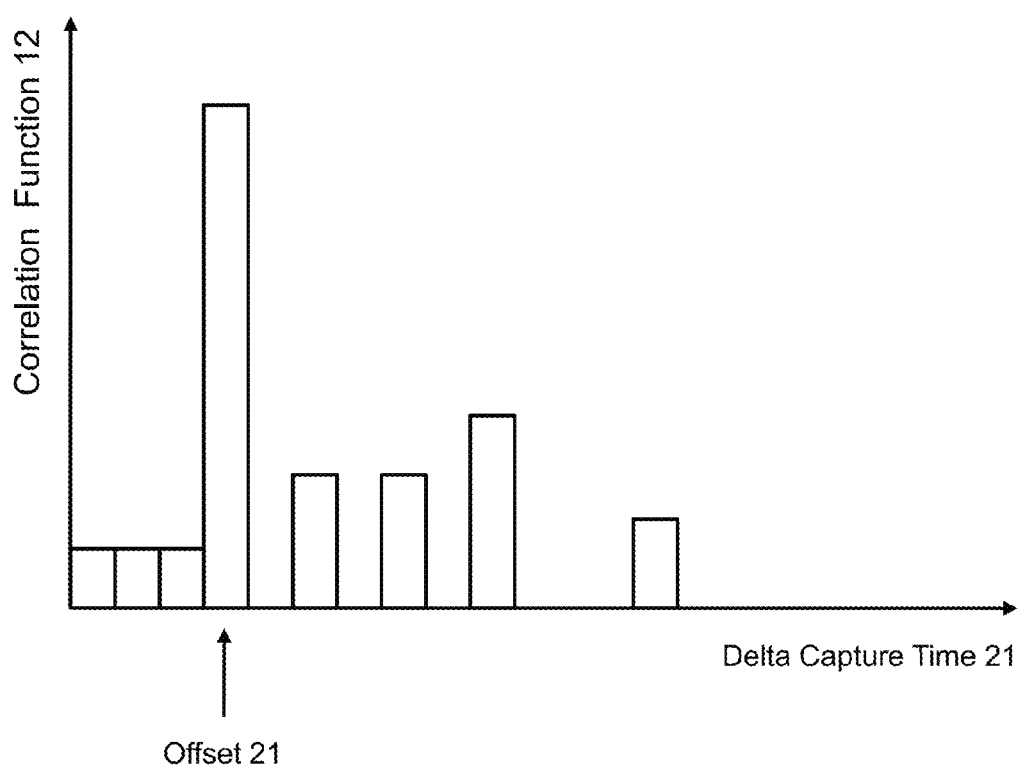
FIG. 9 shows a correlation function of the image count distributions for two cameras.

Referring to FIG. 9, a correlation function 12 between ICD1 and ICD2 can be calculated (step 740) by the computer device 60, the mobile device 61, or the computer processor 36 (FIG. 2). Most pictures on camera 1 and camera 2 are both taken mostly at "photographic events" (e.g. zoo, beach). Picture taking at other times are few and not correlated between the two cameras. The correlation between ICD2 and ICD1 should be peaked at the offset 21, when plotted as a function of the delta capture time 21 (the difference between the capture times of the two cameras). In other words, the maximum value of the correlation function can be used to determine the offset 21 in the capture times (or the clock and dates) between the two cameras (step 750). Similarly, offset 31 can be automatically determined by the computer device 60 or the computer processor 36 (FIG. 2) by computing the correlation function between ICD3 and ICD1.

The precision and the accuracy of the offset times can be improved by varying the time interval for sampling the image counts. While short time intervals (e.g. 15 seconds, 30 seconds, 1 min, etc.) can be precise in sampling image capture times, the image count within each time interval is low and so is the chance that two cameras capture images at exactly the same moment. The correlation functions can often be noisy for accurately determining offset. On the other hand, although long time intervals (e.g. 60 min, 90 min, etc.) tend to include higher image counts per time interval, there is a higher probability that different events are covered in the same time interval, which decreases the specificity in correlating different events. By selecting a second time interval (step 760), a second offset value can be determined using steps 720-750 between the image capture times of the first and second cameras (step 770). The offset value can be selected among different values using the high signal-to-noise ratio (e.g. the maximum value relative to background) at the small peak width in the correlation function (step 780). Varying the duration of time interval can optimize the temporal precision (relating to peak width) and the accuracy (relating to sign-to-noise ratio) in the determination of the offset. For example, an optimal period may be found in a range including 2 min, 5 min, 10 min, 15, min, 20 min, 30 min, and 45 min time intervals for sampling image counts in ICDs.

Figure 10:
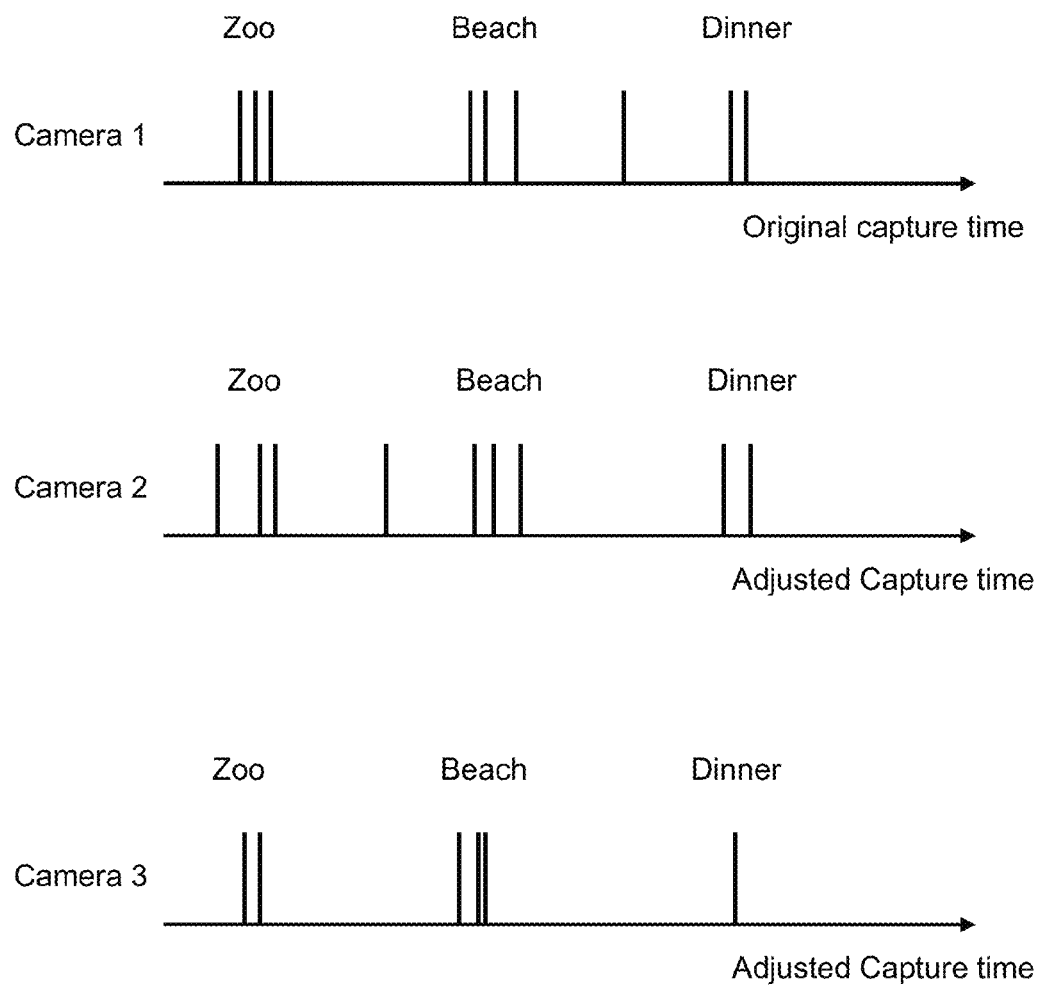
FIG. 10 shows image counts plotted against adjusted image capture times.

Once the offsets (e.g. Offset 12 and Offset 13) in the capture times between cameras are determined (automatically or manually), the offsets are subtracted from the respective capture times of the different image capture devices (step 250, FIG. 2) to product adjusted capture times. For example, the capture time of camera 1 can be used as a common reference. The capture times of images by camera 2 are subtracted by offset 21 such that the image capture times of images obtained by both camera 1 and camera 2 are based on the original capture time of camera 1. Similarly, the capture times of images by camera 3 are subtracted by offset 31. The adjusted capture times are stored in association with their respective images obtained by cameras 2 and 3 (step 260, FIG. 2). The adjusted capture times can for example be stored in the respective EXIF files or in a separate metadata field. Since the native capture time of camera 1 is used as the standard base capture time, no adjustment is needed for the capture times for images from camera 1. FIG. 10 shows that the image counts of camera 2 and camera 3 are plotted against the adjusted image capture times.

Figure 11:
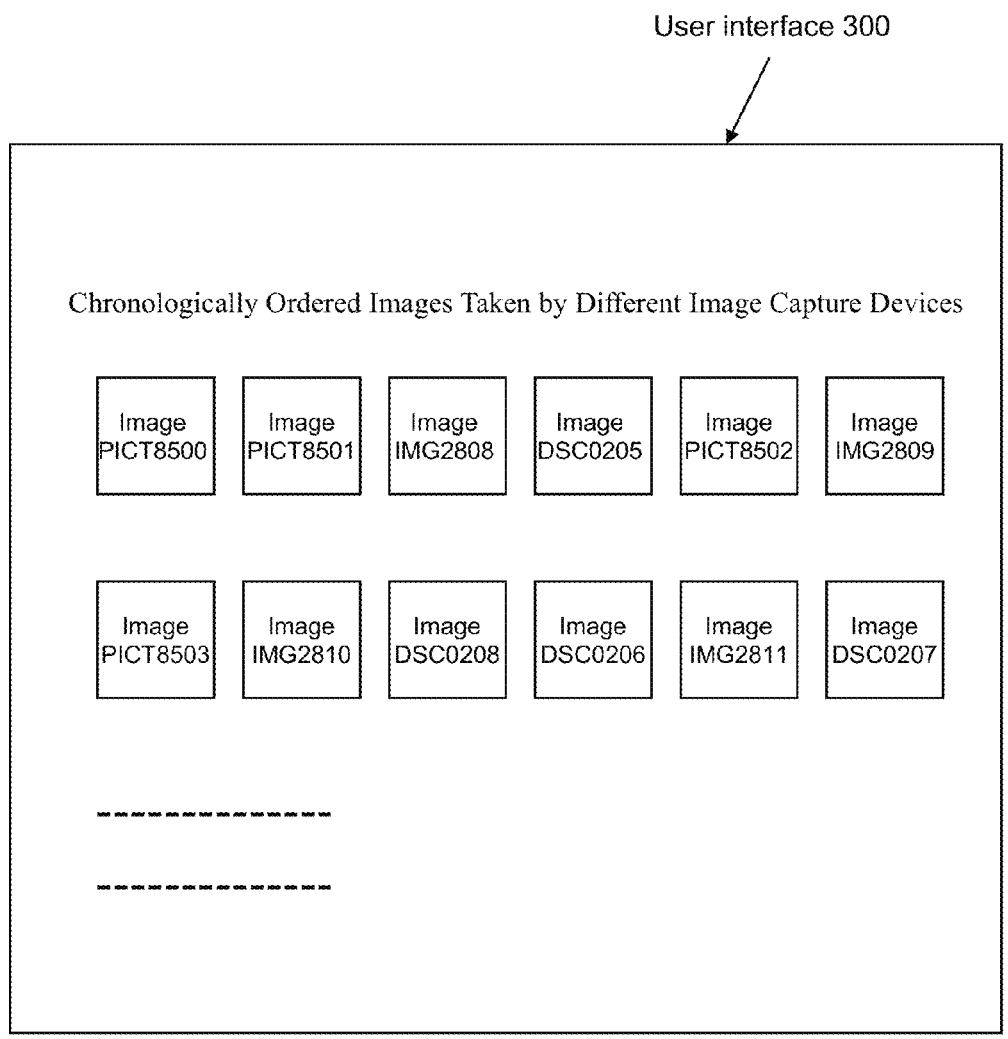
FIG. 11 shows the intelligently sequenced images taken by different image capture devices.

The images from image capture devices (camera 2-3) are sequenced using their respective adjusted capture times (step 270, FIG. 2). The images obtained by camera 1 are based on their originally recorded image capture times because they are used as the reference for determining the offset (so the adjusted image capture times for camera 1 are the same as the original image capture times). The images from different image capture devices (cameras 1-3) are combined in a list in the user interface 300, and sequenced in a chronological order based on adjusted image capture times (cameras 2, 3) on the computer device 60, the mobile device 61, or enabled by the server 32, as shown in FIG. 11 (step 280, FIG. 2).

In the present invention, it is not necessary that the capture time used as the common reference is set as the correct time and date. In some cases, none of the cameras has the time and date. The images from different cameras or other image capture devices can be chronically sequenced without knowing or using the correct date or time.

After the images from different cameras are combined in a single group in the user interface 300 and sequenced in a chronological order based on adjusted image capture times, the user 70, 71 can create an image product such as a photobook or a web media such as a blog page, using the images from different image capture devices based on the adjusted image capture times (step 290, FIG. 2). The web media containing the images can be published by the server 32 via computer network in the chronicle sequence based on the adjusted image capture time.

The image product such as the photobook can be locally produced, or ordered by the user 70, 71 at the data center 30 and then sent to product a fulfillment center 40, 41, which produces the ordered products, and deliver the recipients (100, 105 in FIG. 1) specified by the user 70, 71. The product fulfillment center 40 includes a server 42, and the storage and retrieving systems for pre-made off-the-shelf products. For the fulfillments of personalized image products, the product fulfillment center 40 can include one or more printers 45 for printing images, finishing equipment 46 for operations such as cutting, folding, binding the printed image sheets, and shipping stations 48 for verifying the orders and shipping the orders to recipients 100 and 105. Examples of the printers 45 include can be digital photographic printers, offset digital printers, digital printing presses, and inkjet printers. The finishing equipment 46 can perform operations for finishing a complete image product other than printing, for example, cutting, folding, adding a cover to photo book, punching, stapling, gluing, binding, and envelope printing and sealing. The shipping stations 48 may perform tasks such as packaging, labeling, package weighing, and postage metering.

An advantageous application for chronically sequencing images from different capture devices is the creation of photobooks. A photobook may utilize hundreds of images from different cameras. Most users like to place images on the book pages in a chronological order: earlier images appear on the first few pages while later images appear on the later pages. Once the images are correctly sequenced, it is much easier for a user to select and place images onto the pages. In some embodiments, chronically sequenced images allow the images to be automatically placed on the book pages, which can greatly reduce the time and effort required for a user to create a photobook.

Detailed configurations and steps can differ from the examples described above without deviating from the spirit of the present invention. The disclosed methods are not limited to applications over computer network; rather, they are applicable to standalone computer devices such as personal computers, laptop computers, tablet computers, mobile devices, and other computing devices that can help users to organize images. The image capture devices, the computer devices, and the wireless devices are not limited to the examples used above.

What is claimed is:

1. A method for organizing images from multiple image capture devices, comprising:
   sequencing images captured by a first image capture device based on the image capture times recorded by the first image capture device;
   sequencing images captured by a second image capture device based on the image capture times recorded by the second image capture device;
   determining an offset between image capture times recorded in the first image capture device and image capture times recorded in the second image capture device, wherein the step of determining an offset comprises:
      sampling image counts of images captured by the first image capture device at a first time interval to create a first image count distribution (ICD);
      sampling image counts of images captured by the second image capture device at the first time interval to create a second ICD;
      computing a first correlation function between the first ICD and the second ICD by a computer; and
      using the first correlation function to determine a first value for the offset between image capture times in the first image capture device and the second image capture device; and
   adjusting the image capture times recorded in the second image capture device by the first value for the offset to produce adjusted image capture times by a computer processor.

2. The method of claim 1, further comprising:
   after the step of adjusting, sequencing the images taken by the second image capture device based on the adjusted image capture times.

3. The method of claim 1, wherein the first value for the offset is determined by a maximum value in the first correlation function.

4. The method of claim 1, wherein the first time interval is in a range from about 2 minutes to about 45 minutes.

5. The method of claim 1, wherein the step of determining an offset further comprises:
sampling image counts of images captured by the first image capture device at a second time interval to create a third image count distribution (ICD);
sampling image counts of images captured by the second image capture device at the second time interval to create a fourth ICD;
computing a second correlation function between the third ICD and the fourth ICD;
using the second correlation function to determine a second value for the offset between image capture times in the first and the second image capture devices; and
selecting one of the first value and the second value, wherein the image capture times recorded in the second image capture device are adjusted by the selected one of the first value and the second value.

6. The method of claim 1, wherein the step of determining an offset further comprises:
allowing a user to select, using a computer device, a first image captured by the first image capture device and a second image captured by the second image capture device and to identify the first image and the second image as having been taken at about the same time; and
computing the offset based on image capture times of the first image and the second image.

7. The method of claim 1, wherein the first value for the offset is related to a difference between clock times in the first image capture device and the second image capture device.

8. The method of claim 1, further comprising:
allowing a computer device to display the images taken by the first image capture device and the second image capture device in a chronological order.

9. The method of claim 8, wherein the computer device is connected to the computer processor via a computer network.

10. The method of claim 8, wherein the computer processor resides in the computer device.

11. The method of claim 1, wherein the first image capture device and the second image capture device comprise at least one of a digital camera, a camera phone, a video camera, a laptop computer, or a tablet computer.

12. The method of claim 1, further comprising:
allowing the design of an image product to incorporate the images from the first image capture device and the second image capture device in a chronological order.

13. The method of claim 1, further comprising:
allowing a web media to publish the images from the first image capture device and the second image capture device in a chronological order.

14. The method of claim 13, wherein the web media comprises a blog page.

15. A computer system, comprising:
one or more computer processors configured to determine an offset between image capture times recorded in a first image capture device and image capture times recorded in a second image capture device, to sample image counts of images captured by the first image capture device at a first time interval to create a first image count distribution (ICD), to sample image counts of images captured by the second image capture device at the first time interval to create a second ICD, to compute a first correlation function between the first ICD and the second ICD, to use the first correlation function to determine a first value for the offset between image capture times in the first image capture device and the second image capture device, to adjust the image capture times recorded in the second image capture device by the first value for the offset to produce adjusted image capture times, and to sequence images taken by the second image capture device based on the adjusted image capture times.

16. The computer system of claim 15, wherein the first value for the offset is determined by a maximum value in the first correlation function.

17. The computer system of claim 15, wherein the first time interval is in a range from about 2 minutes to about 45 minutes.

18. The computer system of claim 15, wherein the one or more processors are configured to allow a user to identify a first image captured by the first image capture device and a second image captured by the second image capture device which are taken at about the same time, wherein the one or more processors are configured to compute the offset based on image capture times of the first image and the second image.

* * * * *